US009767843B2

(12) United States Patent
Kashyap et al.

(10) Patent No.: US 9,767,843 B2
(45) Date of Patent: Sep. 19, 2017

(54) FRAGMENTED DATA STORAGE BANDS

(71) Applicant: Seagate Technology LLC, Cupertino, CA (US)

(72) Inventors: Anil Kashyap, Eden Praire, MN (US); Brian T. Edgar, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 2 days.

(21) Appl. No.: 15/017,228

(22) Filed: Feb. 5, 2016

(65) Prior Publication Data

US 2017/0229145 A1   Aug. 10, 2017

(51) Int. Cl.
*G06F 3/06* (2006.01)
*G11B 20/12* (2006.01)

(52) U.S. Cl.
CPC ........ *G11B 20/1217* (2013.01); *G06F 3/0604* (2013.01); *G06F 3/064* (2013.01); *G06F 3/065* (2013.01); *G06F 3/0631* (2013.01); *G06F 3/0676* (2013.01); *G11B 2020/1238* (2013.01)

(58) Field of Classification Search
None
See application file for complete search history.

(56) References Cited

U.S. PATENT DOCUMENTS

2013/0135767 A1   5/2013  Hall et al.
2015/0339319 A1   11/2015  Malina

*Primary Examiner* — Kevin Verbrugge
(74) *Attorney, Agent, or Firm* — Holzer Patel Drennan

(57) ABSTRACT

An implementation of a system disclosed herein provides a method for managing data streams of sequential nature, wherein the method writes the sequential chunks (fragments) directly to an open band in the order these are received from the host and includes determining an end of the incoming data write request related to streaming data and in response to the determination of the end of the incoming data write request related to streaming data, copying remaining data from a current physical band mapped to logical block addresses LBAs related to the data write requests to the allocated (open) band.

20 Claims, 6 Drawing Sheets

FRAGMENTED DATA STORAGE BANDS

BACKGROUND

Disc drives are data storage devices that store digital data in magnetic form on a rotating storage medium called a disc. Each surface of a disc may be divided into several hundred thousand tracks arranged in tightly-packed concentric circles. Each track is further broken down into sectors that are arranged sequentially. That is, each sector on a track is adjacent to the previous and next sector. Generally, each of the surfaces in a disc drive has a recording head for reading and writing data to a sector with one head per surface of the disc. Data is accessed by moving the heads from the inner to outer part (and vice versa) of the disc drive by an actuator assembly. During a data access operation, one of the heads is positioned over the desired location of a sector on the disc in order to access (i.e., read or write) the sector.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides a method for managing data streams of sequential nature wherein the sequential data streams that lie in a logical band are written to a corresponding physical band in the order these are received from the host. The method includes determining an end of the incoming data write request related to streaming data and in response to the determination of the end of the incoming data write request related to streaming data, copying remaining data from a current physical band mapped to logical block addresses (LBAs).

These and various other features and advantages will be apparent from a reading of the following detailed description.

BRIEF DESCRIPTIONS OF THE DRAWINGS

A further understanding of the various implementations described herein may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTIONS

Figure 1:
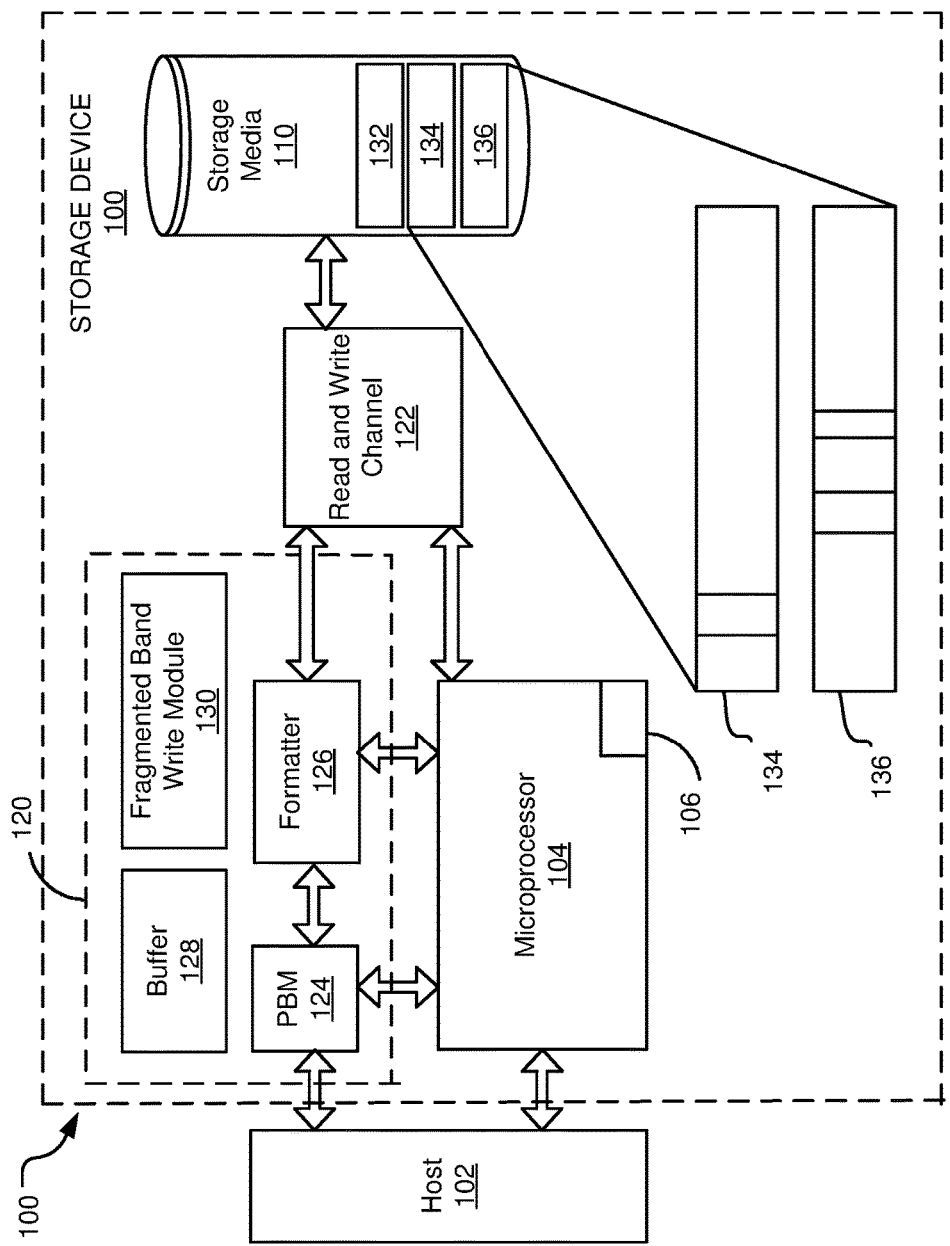
FIG. 1 illustrates example functional components of a storage device implementing fragmented data storage bands.

Implementations of the technology described herein are disclosed herein in the context of a read channel throughput management system. Reference will now be made in detail to implementations of the technology described herein as illustrated in the accompanying drawings and the following detailed description to refer to the same or like parts.

Magnetic media storage drives store data in polarized cells on one or more magnetized media within each storage drive. A magnetic disc drive is one implementation of a magnetic media storage drive in which the magnetic medium is a disc and the polarized cells are arranged on the disc in concentric, generally circular tracks. In operation, one or more of the discs rotate at a constant high speed within the storage drive while information is written to and read from the tracks on the disc(s) using an actuator assembly. The actuator assembly rotates during a seek operation about a bearing shaft assembly positioned adjacent the discs.

The actuator assembly includes one or more plurality of actuator arms that extend towards the discs. Mounted at the distal end of each of the actuator arms is a head with a read pole and a write pole. The write pole generates a magnetic field adapted to change the magnetic polarization of the cells on a corresponding disc (i.e., it writes data to the disc) and the read pole detects the magnetic polarization of the cells on the corresponding disc (i.e., it reads data from the disc).

In a non-shingled magnetic medium, each of the cells on the magnetized medium are of a sufficiently large size relative to the size of the write pole to allow the write pole to write data to the cells without overwriting data in any surrounding cells. As a result, data may be randomly written to available cells anywhere on the magnetic medium. However, as requirements for data storage density increase for the magnetic media, cell size decreases. A commensurate decrease in the size of the write pole is difficult because a strong write field gradient provided by a larger write pole is often required to shift the polarity of the cells on the magnetized medium. As a result, writing data to smaller cells on the magnetized medium using the relatively larger write pole may affect the polarization of an adjacent cells (i.e., overwrite the adjacent cells). One technique for adapting the magnetic media to utilize smaller cells while preventing adjacent cells from being overwritten during a write operation is shingled magnetic recording (SMR).

SMR utilizes a large strong write field generated by the write pole. One constraint of shingled magnetic recording is that when the data is written to the magnetic media, it is written in sequentially increasing or decreasing radius tracks. The strong write field overlaps a currently written track with a previously written track, leaving a relatively small strip of the previous write track unaffected, and also overlaps that currently written track with one or more not-yet-written tracks. The remaining strip of written data on the previously written track contains the aforementioned cells that, while merely a fraction of the feasible write size, are sufficiently large to be read using the read pole. As a result, while SMR still allows for traditional random access read operations, writes can no longer be done randomly because a single-track write modifies/overwrites the one or more not-yet-written (or yet-to-be written) tracks. As a result, in order to change any data cell within the shingled data, the entire shingled data is re-written in the selected sequential write order.

For example, in a disc drive using SMR, tracks on a disc are grouped together as a band and writing data to one track of the band may erase the data on the next adjacent track of that band. As a result, writing any data to a band requires writing data to the entire band. Thus, even if the amount of data to be written to a part of a band is small, the entire band has to be re-written to ensure that no data is lost during the write operation. As a result, random write operations to parts of band on SMR disc drive takes more time than non-SMR disc drives. Such loss of time is specifically large in case of SMR disc drives with bigger band size, such as, for example, 100 tracks/band.

Such loss of time can be significant when large quantity of data is written to SMR bands. The technology disclosed herein presents a solution that reduces such loss of time for certain types of data. For example, from the trace analysis of video acquisition benchmarks, it is observed that while video streams are substantially sequential in nature, they are not purely sequential. Typically, the video stream writes arrive as bursts of 1-4 MB packets, resulting from sets of sequential commands. Furthermore, typically multiple streams are active over the drive and often there may be multiple active streams that are directed to a given SMR band. For example, in client applications the number of streams is usually less than eight, whereas in enterprise level video streaming systems the number of active streams can be as high as 250. The technology disclosed below presents a solution that efficiently handles video streams or other substantially sequential workloads on SMR drives.

Specifically, the method and system disclosed herein uses open bands as destination bands for the incoming sequential data. Thus, the large write packets of sequential stream are handled as virtual streams and written directly to such open bands in accordance with SMR writing rules. Thus, the logical block address (LBA) space is virtualized within band boundaries. This approach provides an efficient solution especially when the workload has high temporal locality and when the number of bands being written at any given time is limited to a few hundred. Examples of such workload include workload generated by video streaming data, workload in some cloud solutions such as that for Hadoop data warehouse, etc. In one implementation, the streaming data includes at least one of a plurality of small fragments and multiple interleaved streams. For example, the streaming data may have intervals between such small fragments and the multiple interleaved streams.

FIG. 1 illustrates functional components of a storage device 100 implementing fragmented data storage bands. Specifically, FIG. 1 shows one or more functional circuits that are resident on a disc drive printed circuit board used to control the operation of the disc drive. The storage device 100 is operably and communicatively connected to a host computer 102. Control communication paths are provided between the host computer 102 and a disc drive microprocessor 104, the microprocessor 104 generally providing top-level communication and control for the storage device 100 in conjunction with programming for the microprocessor 104 stored in microprocessor memory (MEM) 106. The MEM 106 can include random access memory (RAM), read only memory (ROM) and other sources of resident memory for the microprocessor 104. Storage device 100 stores data on a storage media 110 such as magnetic discs, optical discs, etc. In one implementation, the storage media 110 may store data using SMR on a plurality of data bands 132, 134, 136, etc. Each of the data bands 132, 134, 136 may be mapped to logical block addresses (LBAs) that are managed by the interface 120.

Communication paths are provided between the host computer 102 and the storage media 110 via an interface 120 and a number of read/write channels 122 (referred to hereinafter as read channel 122 or as write channel 122). The interface 120 includes a disc drive platform buffer manager (PBM) 124, a buffer 128 and a formatter 126 (also known as common formatter, disc formatter, etc.). Data is transferred between the host computer 102 or other device and the storage device 100 by way of the interface 120. The buffer 128 facilitates high-speed data transfer between the host computer 102 or other device and the storage device 100. Data to be written to the storage device 100 is thus passed from the host computer 102 to the interface 120 and then to the write channel 122, which encodes and serializes the data into data symbols and provides the requisite write current signals to the heads of the storage media 110.

To retrieve data that has been previously stored in the storage media 110, read signals are generated by the heads of the storage media 110 and provided to the read channel 122. In one implementation of the storage device 100, the read channel 122 performs decoding and error detection and correction operations and outputs the retrieved data to the formatter 126 for subsequent transfer to the host computer 102 or other device.

In one implementation of the storage device 100, the interface 120 includes a fragmented band write module 130. The fragmented band write module 130 may be implemented as software, hardware, firmware, or combination thereof. The fragmented band write module 130 analyzes that incoming data from the host 102 to determine whether the data represents substantially sequential writes to the storage media 110. For example, the fragmented band write module 130 may monitor a series of write commands from the host 102 and determine that the target write bands as represented by the incoming write commands show high temporal and/or spatial locality. The locality may be determined based on whether a series of incoming streaming write commands in a given time window are directed to an area of the drive that is limited to a few percent of the drive capacity. Time window for locality detection could range from 2 minutes to 30 minutes and the spatial locality ranges of interest would be 0-10%. The other parameter that would be monitored is how fully the bands are being written before the streams dry up. As an example, if a series of incoming write commands are directed to a single SMR band 130, this series of write commands maybe determined to be sequential workload and therefore candidates for being handled as virtual streams and written directly to open bands in accordance with the technology disclosed herein.

Once the fragmented band write module 120 determines that the write data is sequential write data, it assigns a new band from the storage media 110 to the LBAs of the write data. For example, if the LBAs of the write data are mapped to a current (physical) band 136, instead of performing the normal SMR band rewrite operation to write data to the current band 136, the fragmented band write module 120 maps the LBAs of the write data to an open band 134. Thus, in effect, for a period of time when write data of high temporal locality is being received, the fragmented band write module 120 maps two bands, the current band 136 and an open band 134, to the LBAs of the write data.

As a result, the write data is written to the open band 134 and the corresponding LBA range in the current band 136 is invalidated. Once the fragmented band write module 120 determines that the incoming write data of high temporal locality or substantially sequential data has stopped, the fragmented band write module 120 enters a band closing state where any valid data that is left on the current band 136 is copied to the end of the open band 134. Once substantially all valid data from the current band 136 is copied to the open band 134, the current band 136 is released to a free pool of bands that can be used for data storage. The band 134 now becomes the new location for that logical LBA space—no further cleaning or defragmentation of this data is required since it is written in a mostly sequential manner. The operations of the fragmented band write module 120 are described in further detail in the following figures and the related description.

Figure 2:
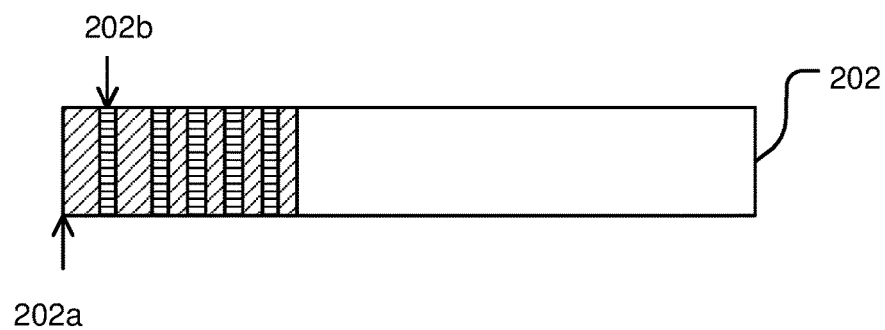
FIG. 2 illustrates an example band filling state of fragmented data storage bands to manage sequential writes.
Figure 2:
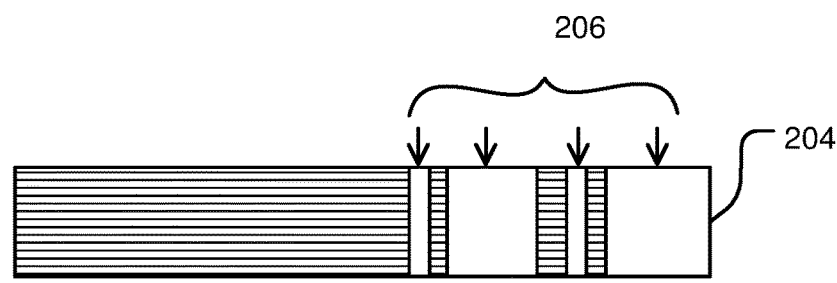

FIG. 2 illustrates a block diagram 200 of a band filling state of fragmented data storage bands. Specifically, FIG. 2 illustrates an open band 202 and a current band 204 of an SMR storage media. When a fragmented band write module (not shown) of a storage device (not shown) determines that incoming write data is candidate for virtual stream, the write data is written to the open band 202. The band write module of the storage device may determine a write to be a streaming write based on one or more different criteria. For example, one criterion may be evaluating the transfer length of the write data. In such a case, a transfer length above a predetermined threshold may indicate a streaming write or a sequential write. Another criterion could be the detection of a set of sequential commands being received from the host.

For example, in FIG. 2, a first stream 202a and a second stream 202b are identified as being candidates for being virtual streams. The LBAs of the streams 202a and 202b may be mapped to sections of the current band 204. However, as these streams are identified as being substantially streaming or sequential data, the band write module of the storage device allocates sections of the open band 202 to the streams 202a and 202b. Thus, during the band filling state there are two physical bands (the current band 204 and the open band 202) assigned to the same LBA space. The open band 202 may be selected from a set of bands that may be determined from a free band list stored by the storage device. Note that while in FIG. 2, there are two streams 202a and 202b that are shown as alternating on the open band 202, in an alternative implementation, more than two streams may be alternating and sequentially stored on the open band 202. In one implementation, the data of the streams 202a and 202b are stored on the open band 202 in the order in which the data arrives. However, alternative mode of storing the data of such streams may also be used. For example, in an alternative implementation, the data streams 202a and 202b are stored on the open band 202 substantially in the order in which the data arrives. For example, a storage controller may apply some filtration to the data streams 202a and 202b so as to process slightly out of order commands and order them such that the writing to the storage media is more sequential. While only two streams are shown in the figure for illustration the concept can be extended to multiple sequential streams directed to the band.

The current band 204 shows the locations 206 where the data of the alternating streams 202a and 202b may be originally mapped to. In other words, if the open band 202 were not allocated, the data from the streams 202a and 202b would have been mapped to the one or more of the locations 206. As the streams 202a and 202b are written on the open band 202, the data at the locations 206 are invalidated. As more of the data from the streams 202a and 202b (or additional streams that were originally mapped to the current band 204) are written to the open band 202, more and more of the data of the current band 204 becomes invalidated. Furthermore, such writing of the data to the open band 202 instead of the current band 204 adds discontinuity when the switch to an alternative stream happens, resulting in LBA space mapped to the open band 202 and the current band 204 to be fragmented. In one implementation, the fragmented band write module of the storage device may maintain a table that tracks each of the LBA ranges of the streams and their mapping to either the current band 204 or to the open band 202.

As the band write module of the storage device writes data to the open band 202, it also monitors the incoming writes to ascertain the end of the substantially sequential data. For example, such determination may be based on end of the sequential nature of the workload, or receiving all the data for the band. Upon such determination, the band write module of the storage device enters a band closing state. Also, the band write module of the storage device monitors the usage of the open band 202 to ascertain when the open band 202 is close to being filled. For example, a predetermined threshold percentage usage, such as eighty percentages, etc., may be used as a criterion to determine that the open band 202 is getting filled. Upon such determination, the band write module of the storage device enters the band closing state.

Figure 3:
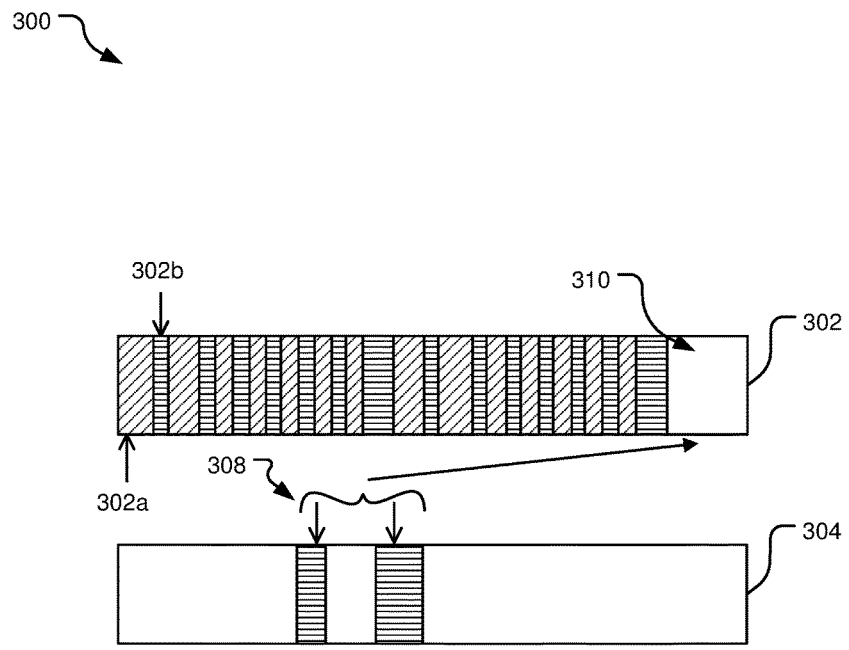
FIG. 3 illustrates an example band closing state of fragmented data storage bands used to manage sequential writes.

FIG. 3 illustrates a block diagram 300 of band closing state of fragmented data storage bands. Specifically, FIG. 3 illustrates an open band 302 and a current band 304 during a band closing state. At this state, most of the data from the current band 304 is invalidated and only a few sections of the data on band, as illustrated by sections 308 is valid. On the other hand, the open band 302 is substantially filled with the data of various streams 302a, 302b, etc., that were initially mapped to the current band 304 and as such only a small portion 310 of the open band 302 is unused and available. During the band closing state, the data from the remaining valid sections 308 of the current band is copied to the end of the open band 302 in the unused section 310. Subsequently, the data from the sections 308 is invalidated, resulting in all data from the current band 304 being invalidated. At this time, the current band 304 is marked as a free band, added to the list of free bands, and released to a free band pool so that it can be used for another stream.

Figure 4:
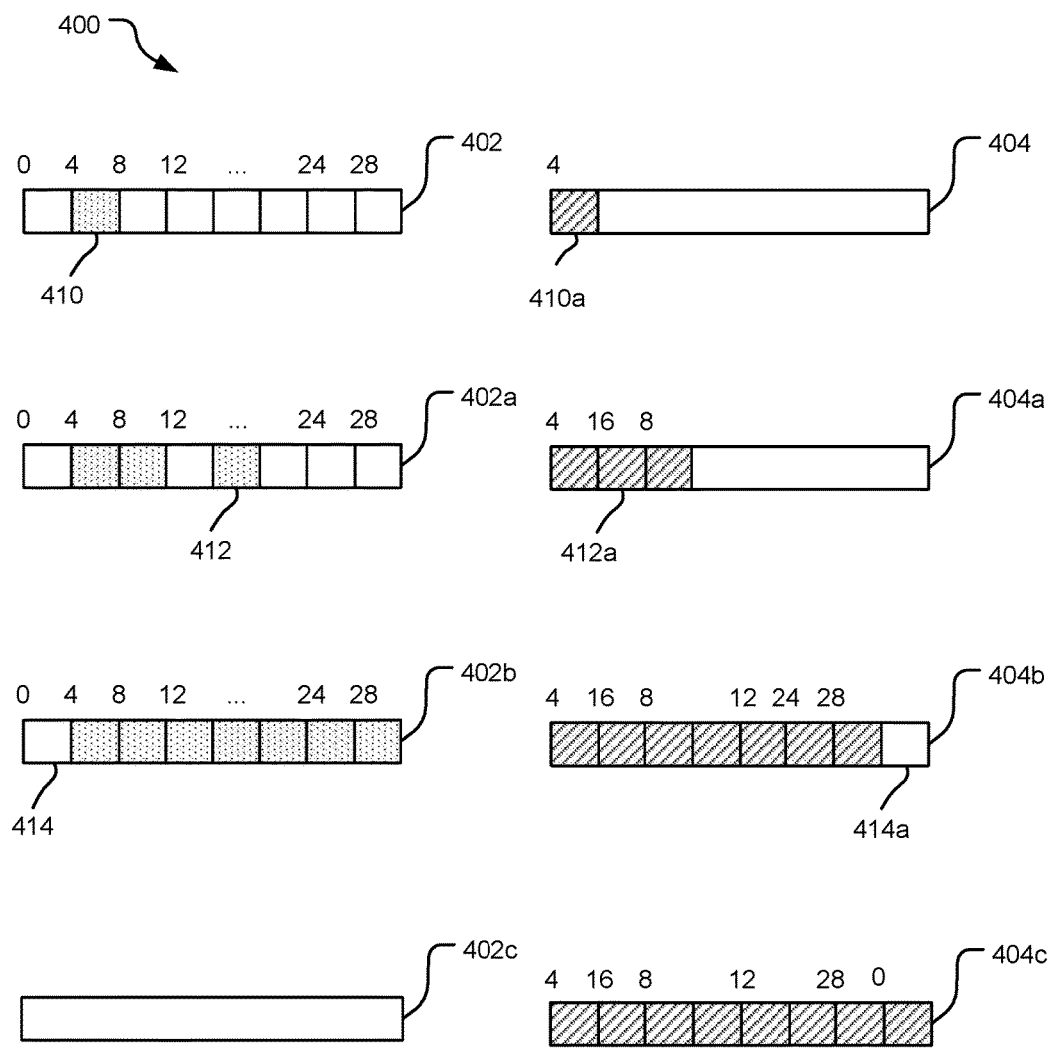
FIG. 4 illustrates an alternative example of band filling state of fragmented data storage bands to manage sequential writes.

FIG. 4 illustrates an alternative block diagram 400 of band filling state of fragmented data storage bands to manage sequential writes. The band filling is illustrated with a source band (or current band) 402 and a destination band (or open band) 404. In an implementation, each of these bands are SMR bands that are written sequentially from beginning of the bands (left) to the end (right). The source band 402 contains the current data for the band. The data is shown in blocks of 4 MB.

For example, the streaming writes W to the source band 402 are coming in the following order:

W: 4-7, 16-19, 8-11, 20-23, 12-15, 24-27, 28-31.

As the new streaming writes to the source band 402 are detected, a fragmented band write module of the storage device opens the destination band 404 as the new band for writing the streaming writes. For example, the fragmented band write module of the storage device may decide that the writes W are sequential in nature based on their temporal locality or transfer length. Once the destination band 404 is opened, the LBAs of the streaming writes W are assigned to the destination band 404. Thus for example, the LBAs for the streaming write $W_1$ (blocks 4-7) are mapped to the block 410a in the destination band 404. When the write to the block 410a in the destination band 404 is completed, the corresponding block 410 in the source band 402 is invalidated. Also, the mapping of the LBAs to the block 410 is cancelled as the write completes, i.e., the command status is sent back to the host. Subsequently, the LBAs for the next streaming write $W_2$ (blocks 16-19) are mapped to block 412a in the destination band 404.

This process of writing the streaming writes W to the destination band 404 continues until the fragmented band write module of the storage device determines that the stream of commands resulting in the streaming writes W has dried up. For example, such determination may be made based on a threshold time after receiving the last of the streaming writes W (blocks 28-31). Alternatively, a detection of another set of streaming writes to a different source band (other than 402) may trigger the decision that the streaming writes W has ended.

At this point, as a lot of the LBAs in source band 402 are mapped to the destination band 404 and because each of the blocks in the 402 for such writes have been invalidated, there are only a few valid blocks remaining in the source band. In FIG. 4, the source band at the state 402b shows that all of the blocks 4-28 have been invalidated due to the writes in the streaming writes W. As a result, only the block 414 (0-4) is still valid. As part of band closing state process, the fragmented band write module of the storage device copies the data from the block 414 to an open block 414a at the end of the destination band 404 and invalidates the block 414. At this point, all blocks of the source band 402 are invalidated, as illustrated by the state 402c. The fragmented band write module of the storage device now designates the source band 402 in the state 402c as an open band. The destination band 404 in the state 404c may be designated as a source band if a streaming write to the LBAs mapped to the destination band 404 is detected. In one implementation, once all blocks from the source band 402 are transferred to the destination band 404, no further cleaning activity is required in that the destination band 404 may store the transferred data permanently.

Figure 5:
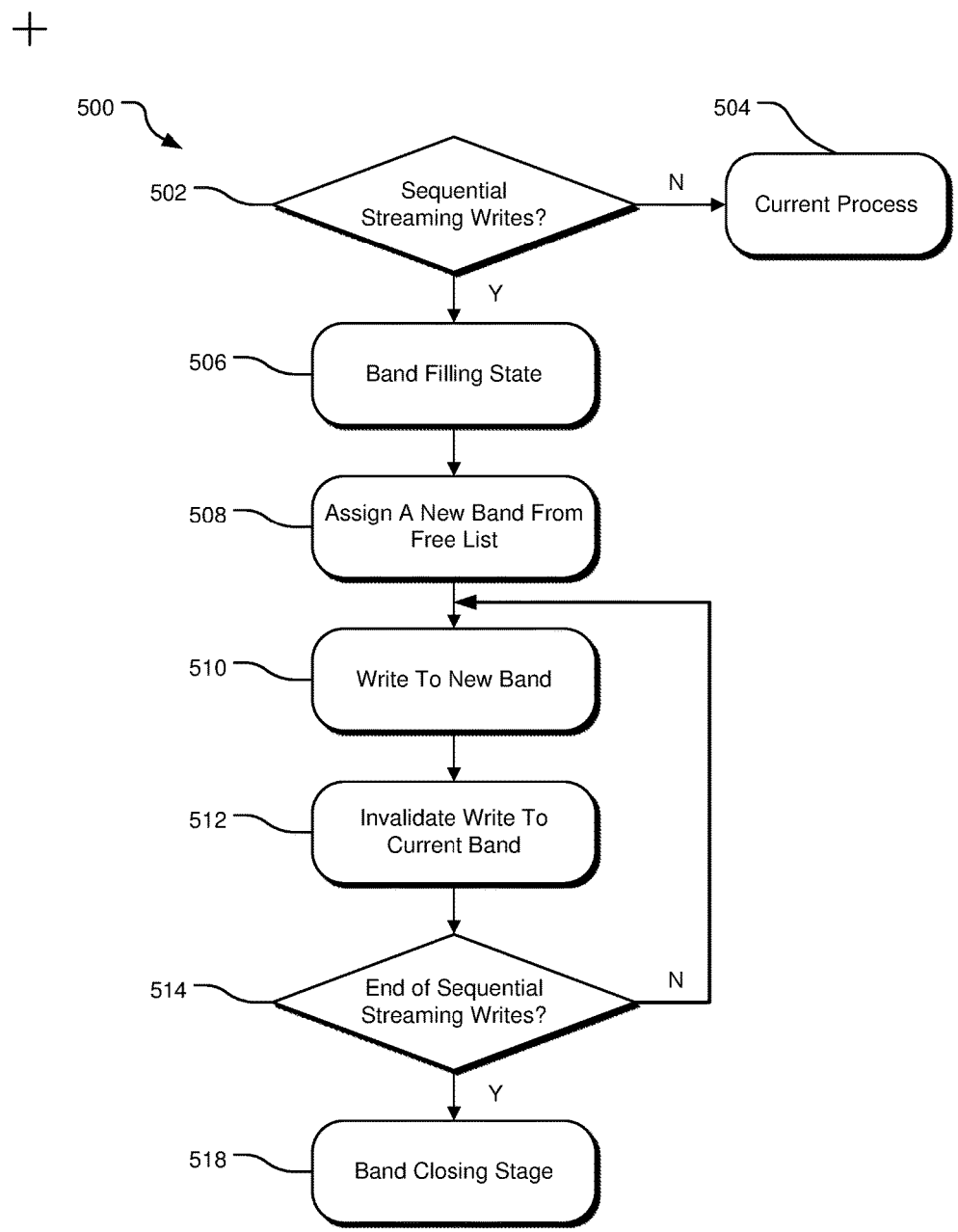
FIG. 5 illustrates example operations for using fragmented data storage bands to manage sequential nature of writes.

FIG. 5 illustrates operations 500 for using fragmented data storage bands to manage sequential nature of writes. An operation 502 evaluates an incoming stream of commands at a storage device to determine if they represent a sequential stream of writes to a source band. If they do not, an operation 504 processes the write commands as per the current process. If the operation 502 determines that the writes represent a sequential stream of writes, an operation 506 initiates a band filling state. An operation 508 assigns a new open band from a list of open bands as a destination band for the incoming stream of writes. Subsequently, an operation 510 writes from the blocks of streaming data to the destination band. Once a block of data is written to the destination band, an operation 512 invalidates a corresponding block in the source band.

An operation 514 evaluates if the stream of sequential writes to the source band has ended. If not, the process of writing the write blocks to the destination band and invalidating the corresponding blocks in the source band continues. If the operation 514 determines that the stream of sequential writes have ended, an operation 516 initiates a band closing state, which is illustrated in further detail below in FIG. 6.

Figure 6:
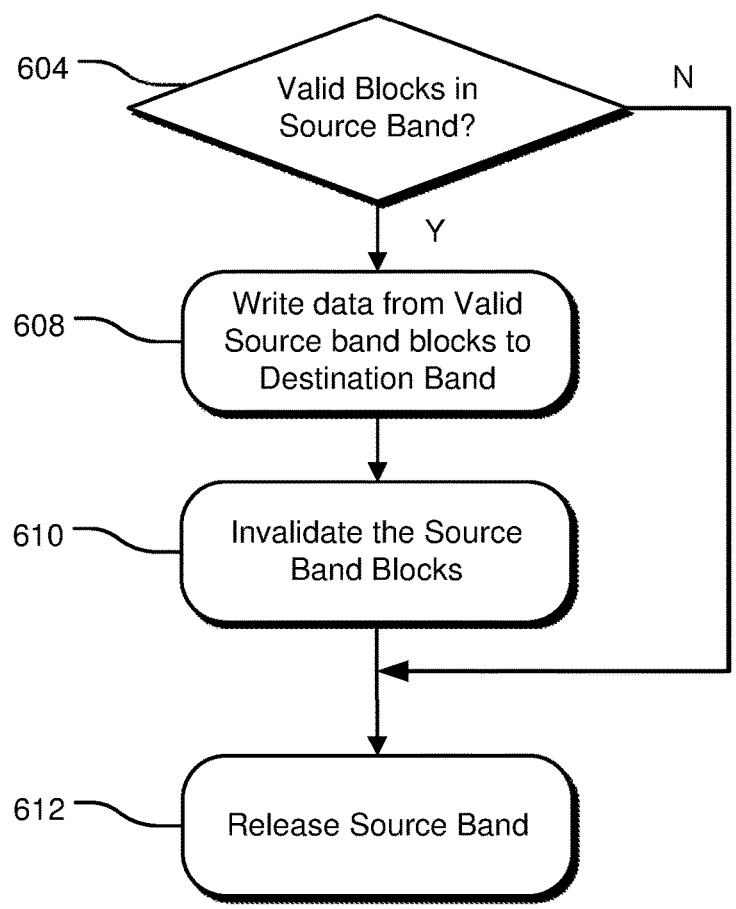
FIG. 6 illustrates example operation of a band closing state for using fragmented data storage bands to manage sequential nature of writes.

FIG. 6 illustrates operation 600 of a band closing state. An operation 604 determines if the source band has any valid blocks. If so, an operation 608 writes data from the valid blocks in the source band to open blocks in the destination band. Specifically, the block in the destination band is selected to be the next available block. Once data from valid block in the source band is written to the destination band, an operation 610 invalidates the source band blocks. After data from all valid blocks in the source band is written to the destination band, an operation 612 releases the source band to the list of open bands so that such open band can be used as a destination band for subsequent writes of sequential streaming data.

The technology disclosed herein allows a disc drive to follow SMR writing rules for newly written data as the data is always written sequentially forward in a band. While the above examples have only two streams per band, the solution can work for multiple streams per band. A potential drawback of the solution is the fragmentation that is introduced for the read operation. However, the performance impact of the fragmentation is limited because the reads are expected to come in similar packets as the corresponding writes. With large reads (1-4 MB) the effect of fragmentation is small and the disc drive can achieve throughput close to that on a conventional drive. Furthermore, because the data is organized by bands the associated data of large streaming reads will be in close proximity. Finally, caching schemes can be used to read up the associated data in the band and thus minimize the seeks.

Implementation of the technology disclosed herein may require that a certain number of bands are maintained in a free pool that can be used for servicing the active streams. For example, in one implementation, during the band filling or active state, each logical band requires two physical bands. A 2 TB drive with 256 MB bands will have around 8000 bands. Assuming approximately 4% allocation for the open bands' the drive can support approximately 320 active streams. Workload analysis for some video streaming workloads indicates that this number of stream is generally sufficient. In typical client applications the number of active video streams is even lesser. In the cloud (Hadoop) workloads the working set (number of active bands) is usually less than 3% of the drive capacity. Thus the disclosed technology can support the streaming requirements for most practical video streaming and some cloud applications with a reasonable amount of over-provisioning. Similarly, the metadata requirements in the storage device to track the resulting stream fragments is small compared to a typical storage drive capacity.

Although the block diagrams and flowcharts disclosed herein describe various embodiments in the context of storage devices for purposes of illustration and explanation, it is to be understood that the technology disclosed herein can be more broadly used for any type of servo control loop that can be subject to vibration.

In one implementation, the block diagrams and flowcharts disclosed above are implemented in hardware and/or in software (including firmware, resident software, microcode, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method, comprising:
    determining if incoming data write requests relate to streaming data directed to a source band; wherein the streaming data includes at least one of a plurality of small fragments and multiple interleaved streams;
    in response to the determination that the incoming data write requests relate to streaming data, allocating a free physical band to logical block addresses (LBAs) related to the incoming data write requests; and
    directly writing streaming data related to the incoming data write requests to the allocated band.

2. The method of claim 1, further comprising:
    determining an end of the incoming data write request related to streaming data; and
    in response to the determination of the end of the incoming data write request related to streaming data, copying remaining data from a current physical band mapped to the LBAs related to the data write requests to the allocated band.

3. The method of claim 1, wherein the streaming data related to the incoming data write requests is written to the allocated band serially from a beginning of the allocated band towards an end of the allocated band.

4. The method of claim 1, further comprising:
    determining a target physical block of the source band associated with the streaming data related to the incoming data write requests; and
    invalidating the LBAs mapped to target physical block of the source band after directly writing the streaming data related to the incoming data write requests to the allocated band.

5. The method of claim 1, wherein determining if incoming data write requests relate to streaming data further comprises determining temporal and spatial locality of the incoming data write requests.

6. The method of claim 1, further comprising:
    determining if the incoming flow of streaming data has ended; and
    if the incoming flow of streaming data has ended, performing one or more band closing state operations.

7. The method of claim 6, wherein the one or more band closing state operations comprising:
    writing data from one or more of valid blocks in the source band to the target band; and
    invalidating LBAs related to the one or more of valid blocks in the source band.

8. The method of claim 7, further comprising releasing the source band to a list of open bands.

9. The method of claim 1, wherein directly writing streaming data related to the incoming data write requests to the allocated band in the order the streaming data is received from the host, further comprising writing streaming data related to the incoming data write requests to the allocated band using shingled media recording (SMR) method.

10. A storage device, comprising:
    a shingled media recording (SMR) media; and
    a fragmented band write module configured to:
        determine if incoming data write requests relate to sequential streaming data directed to a source band,
        in response to the determination that the incoming data write requests relate to sequential streaming data, allocate a free physical band to logical block addresses (LBAs) related to the incoming data write requests, and
        directly write streaming data related to the incoming data write requests to the allocated band.

11. The storage device of claim 10, further comprising a free band list configured to store a list of free bands.

12. The storage device of claim 10, wherein the fragmented band write module is further configured to determine an end of the incoming data write request related to streaming data and in response to the determination of the end of the incoming data write request related to streaming data, copying remaining data from a current physical band mapped to the LBAs related to the data write requests to the allocated band.

13. The storage device of claim 10, wherein the fragmented band write module is further configured to determine if incoming data write requests relate to streaming data based on temporal locality of the incoming data write requests.

14. The storage device of claim 10, wherein the fragmented band write module is further configured to perform one or more band closing state operations if the incoming flow of sequential streaming data has ended.

15. The storage device of claim 10, wherein the one or more band closing state operations comprising:
    writing data from one or more of valid blocks in the source band to the target band; and
    invalidating LBAs related to the one or more of valid blocks in the source band.

16. An apparatus, comprising:
    a fragmented band write module configured to:
        in response to a determination that incoming data write requests relate to sequential streaming data, allocate a free physical band to logical block addresses (LBAs) related to the incoming data write requests,
        write streaming data related to the incoming data write requests to the allocated band, and
        invalidate LBAs mapped to target physical block of the source band after writing the streaming data related to the incoming data write requests to the allocated band, wherein the target physical block of the source band is associated with the streaming data related to the incoming data write requests.

17. The apparatus of claim 16 wherein the each of the free physical band and the source band is a shingled media recording (SMR) band.

18. The apparatus of claim 16 wherein the fragmented band write module is further configured to determine if the incoming data write requests relate to sequential streaming data directed to the source band based on at least one of temporal and spatial locality of the incoming data write requests.

19. The apparatus of claim 18 wherein the temporal and spatial locality of the incoming data write requests is determined based on a percentages of drive capacity utilized per a predetermined time window being below a predetermined threshold.

20. The apparatus of claim 16 wherein the fragmented band write module is further configured to, if incoming flow of sequential streaming data has ended, write data from one or more of valid blocks in the source band to the target band and invalidate LBAs related to the one or more of valid blocks in the source band.

* * * * *